Figure 1:
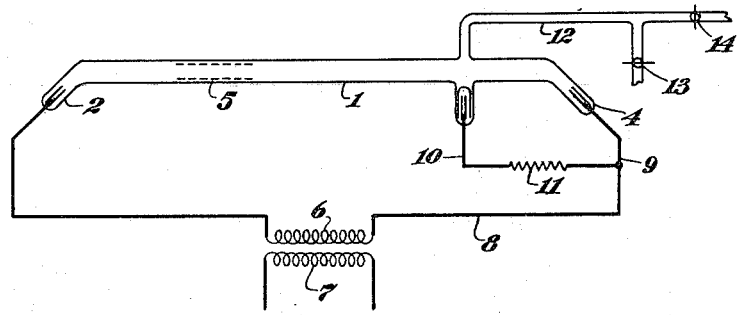

Aug. 9, 1932.  J. BRETTMON  1,870,831

LUMINESCENT DISCHARGE DEVICE

Filed Feb. 10, 1928

INVENTOR
Jacques Brettmon,
BY
ATTORNEYS

Patented Aug. 9, 1932

1,870,831

UNITED STATES PATENT OFFICE

JACQUES BRETTMON, OF PARIS, FRANCE

LUMINESCENT DISCHARGE DEVICE

Application filed February 10, 1928. Serial No. 253,422.

Be it known that I, Jacques Brettmon, a citizen of the Republic of France and resident of 226 rue de Rivoli, Paris, France, have invented a new and useful type of colored luminous discharge tube employing as luminous conducting material the vapors of certain metal molecules, among which are particularly the alkali metals, or alkaline earth metals or metalloids, either pure or in their molecular compounds as hydrides or nitrides in the presence of and augmented in their electrical conductivity by the presence of radium or radium like substances either alone or associated with the monatomic noble gases and the usual luminous tube gases such as for example nitrogen, carbon dioxide etc., and the invention further relates to a process of producing or manufacturing tubes containing the alkaline or alkaline earths, or metalloids, their hydrides or nitrides in such manner as to assure long life and constancy of luminosity in the tubes.

The use of the alkali metals, the alkaline earth metals or certain of the metalloids while desirable has hitherto not been feasible owing to their solid character, which does not permit the use of the same devices as are serviceable in the use of mercury as a luminous conducting body. Moreover the vapor pressures of the substances referred to are very low at ordinary temperatures and in fact do not become appreciable until very high temperatures are reached. Even if the high temperatures required were attained in glass tubes of ordinary composition the direct chemical action at high temperatures as from 200° C. to 400° C. even of the more volatile of the metals as well as certain metalloids would slowly color or diminish undesirably the transparency which the tube initially possessed.

Because then of the low volatility and the chemical reactivity of the alkali metals, alkaline earth metals or metalloids many desirable, useful and beautiful color effects in luminous tubes have been hitherto not used. Thus lithium would give a beautiful red column of luminous vapor, sodium a characteristic yellow, thallium a green, calcium an orange color and in fact a wide range of colors are available provided the difficulties of starting the arc or conduction process and maintaining it thereafter without deleterious action on the vitrious containing tube could be circumvented.

It has frequently been proposed to utilize the ionization produced by radium or radium like substances to diminish the voltage required to start and maintain the flow of current in luminous tubes, particularly in the case of the common mercury arc tubes where for example the tilting of the lamp for starting requires relatively costly and complicated mechanisms. It has further been proposed to employ radium to facilitate the starting of tubes employing gases such as neon for as is well known the initial starting voltage is often quite or at least, undesirably high and simplification of apparatus, as well as of arc stability, would result if the high initial resistance could be overcome.

It has been found in the course of work leading to the present invention that the properties of the emanation of radium and possibly also the relatively few ions present are such, with respect to conductive property, that the great resistance of a high vacuum can be broken down in the presence of the emanation produced from a relatively small trace of radium or emanation giving radiferous substance contained within the tube.

By way of illustration it has been found that a tube provided with the usual type of electrodes for the entrance and exit of electricity and also containing therein a small quantity of, for example, radium salt, may be pumped to a vacuum where 20,000 volts applied to the electrodes fail to cause the transfer of current through the residual gas within the said tube. The tube may now be sealed from the vacuum pump. After several hours it will be found that 10,000 volts will suffice to produce a luminous discharge in the tube and the effect is due to the products of the radium decomposition (emanation) which assists or in conjunction with the traces of residual gases or vapors such as oxygen, nitrogen, carbon dioxide or other material, permits the current to pass with ensuant luminosity. It is of course well known that the equilibrium between, for example, radium bromide and the emanation occurs at 30 days, the last stage of which is helium and radium D. It will then be readily perceived that a small quantity of radium will serve as a practically perpetual generator of emanation and it is the utilization of this property which is fundamental in obtaining the novel results which it is the purpose of this specification to describe. The latter statement is important for the reason that a given quantity of emanation alone has a life of only 48 hours and the actual presence of radium is required to guarantee the supply of emanation within the tube.

The description of the details whereby it is possible to produce a luminous tube whose luminosity is due principally to electrical discharge through metallic vapors of certain metals in the form of molecules formed with nitrogen, hydrogen or possibly oxygen, or even metalloids requires reference first to certain relatively recent facts pertaining to the spectra of substances.

The study of the so-called band spectra of gases as for example nitrogen has revealed certain regularities which interpreted in terms of modern atomic and molecular theory make it possible to compute the position of the numerous lines composing each band in the band spectrum. In this way, a certain normal band structure has come to be recognized. The investigation with modern highly refined equipment has further shown that bands occur in the case of for example the spectrum of boron oxide. This band was originally supposed to be due to boron nitride. These molecular spectra, for the origin of the bands is now definitely known to be due to motions of the molecule as a whole, have been obtained for CuH, ZuH, HgH, $MgH_2$, CdH, and even helium molecules ($He_2$) are present under certain conditions in the discharge tube. In general these and similar molecular compounds have not been prepared in vapor form by ordinary chemical methods in the laboratory, and, so far as I am aware, are not described in any reference work on chemistry. Silicon nitride SiN, CN and other nitrides have been shown also to have definite existence under the conditions of the electric discharges and it is from a knowledge of these results and facts that I explain the successful functioning of my luminous tubes, although it is understood that the novelty of the results which I obtain are in no sense dependent on any particular interpretation of the phenomenon of spectra. It does appear clear, however, that metals can act as emitters of spectra closely related to that of the metallic element but in the molecular form with the gaseous atoms hydrogen, nitrogen or oxygen.

Figure 2:
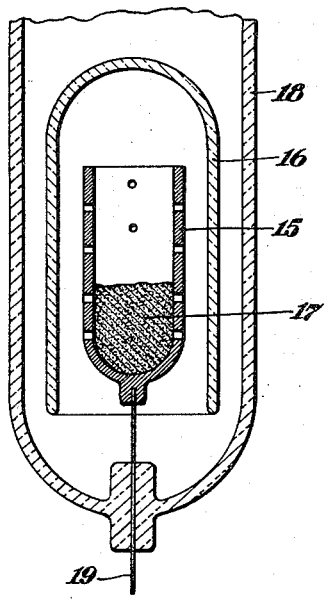

For a description of the process of manufacture of one of my tubes reference should be had to the accompanying drawing in which Fig. 1 represents a discharge tube constructed according to my invention, and Fig. 2 represents an enlarged view of one electrode thereof.

In Fig. 1 there is shown a tube of suitable glass or vitrious material, 1, provided with three electrodes 2, 3, 4. The tube at a convenient stage of the manufacture is washed with a dilute solution of radium salt as for example the chloride of radium to the amount of 25 micro-milligrams dissolved in, for example, about 200 cubic centimeters of distilled water. One pair of the electrodes, for example, 2 and 4, are used for the normal running of the tube. The electrode 3, however, is of special structure and formed from metal into a cup or thimble shaped electrode as represented at Fig. 2. The thimble shaped electrode 15 may be of, for example, steel affixed to the seal wire 19 sealed through the glass 18. The electrode part 15 is surrounded by a glass mantle 16 to protect the glass 18 from the heat which under certain circumstances may be radiated from the electrode shell 15. The electrode shell 15 may be perforated although this is not always necessary and in any event the perforations must be fine enough to prevent the material 1 from sifting through readily. The material 17 consists of, for example, a mixture of carbon and an oxide of a suitable metal whose spectrum it is desired should characterize the luminous light emitted by the electrically excited tube.

Fig. 1 shows at 6 the high tension side of a transformer excited by the supply side 7. The electrical exciting means used to impress a voltage across electrodes 2 and 4 may, however, be of any suitable character. It is to be noted that lead 8 divides into branches 9 and 10 connecting with electrodes 4 and 3 respectively. The branch circuit 10 contains a resistance 11, Fig. 1, whose function will appear in the course of the description relative to the operation of the tube.

The tube prepared as described may be connected to the pump by means of the tublature 12 and exhaustion carried forward in the usual manner well known to those skilled in the art of vacuum tube manufacture. After the usual treatment to disengage adsorbed gases from the glass walls and electrodes, the tube may be closed by the cock 14 and suitable voltage impressed on the electrodes. After the lapse of some time (about three hours) a current will pass due to the development of the emanation produced by the spontaneous decomposition of the radium salt adhering to the tube walls as diagrammatically represented at 5. The contents of the electrode 3 whose detailed construction is disclosed in Fig. 2 becomes heated as a consequence of the current which passes and may be brought to a red heat causing chemical interaction between the carbon and, for example, sodium oxide. The evolved carbon dioxide may be pumped out if present in undesirable amount but at the moment the electrode is at a red heat air is suddenly admitted in order to form the metallic nitride of the metal in electrode 3 liberated from its oxide by the carbon. The nitride, for example of sodium, is thus by the described procedure or any reasonable modification thereof, formed in situ. The excess air is now removed and it will be found on passing the discharge that the lines of the spectrum of sodium can be observed in the emitted light by means of the spectroscope. The lines, however, will be found to be fluted or resemble bands and are, it is believed, due to the nitride or possibly one of the oxides or both molecular compounds which of the two has not been determined with certainty. The fact of importance for the luminous tube art is that the procedure described results in a tube which continues to emit a light characterized principally by the spectrum of the metal, in the specific example given, sodium. The tubes may be operated for long periods of time without the transparency of the glass being impaired and no difficulty is experienced in the prompt starting of the tubes from the cold state. The function of the resistance 11 is now evident for its magnitude is adjusted to a value which will permit current to normally flow between electrodes 2 and 4. Some current, of course, passes from time to time between 2 and 3 and suffices to renew the metal-gas compound as the electrode 3 becomes heated.

The metals which may be used in manufacturing the luminous metal vapor tubes are numerous. All the alkali metals are suitable. Thus lithium will produce a red luminosity, sodium yellow, rubidium violet. The metal calcium functions in like manner giving an orange color while thallium suffices for a green light. It is in fact possible to obtain by the described process a sufficient range of colors which satisfies every need of the luminous tube art. By the term "metal-like element" as used in the appended claims, I intend to include metals, alkaline earths, and metalloids, as all of these are suitable for use in tubes constructed according to the invention. It is to be understood that any gas may be introduced into the tube capable of forming a molecular compound and capable of electrical excitation. The specific example, wherein the use of sodium is described and its conversion into molecular sodium nitride of certain oxides is a particular description of the general method. Moreover it is clear that besides sodium oxide and carbon other mixtures of sodium oxide and reducing substances might be employed.

I claim:

1. The method of forming a molecular compound of a metallic element with nitrogen in a glow discharge tube which comprises admitting nitrogen to the exhausted tube at the moment when the metallic element is at a red heat and subsequently pumping out the excess gases.

2. The method of forming a molecular compound of a metallic element with a gas in a glow discharge tube which comprises admitting the gas to the exhausted tube at the moment when the metallic element is at a red heat and subsequently pumping out the excess gases.

3. The method of producing a metal-gas compound within a glow discharge tube which comprises maintaining a metal-compound-reducing-agent mixture at the reduction temperature while admitting the gas thereto.

4. The method of producing a metal-nitrogen compound in a glow discharge tube which comprises maintaining a metal-compound-reducing-agent mixture at the reduction temperature while admitting nitrogen thereto.

5. The method of obtaining an electric discharge characteristic of a particular metal which comprises forming by means of heat within a discharge tube a normally unstable electrically excitable compound of the metal with a gas.

6. The method according to claim 5 wherein the heat is evolved by the passage of an electrical discharge in the presence of emanation producing radio-active substances.

7. The method of obtaining an electric discharge characteristic of a particular metal which comprises reducing a compound of metal under vacuum conditions by means of heat and a reducing agent, supplying gas to the resultant metal while at red heat to form a normally unstable compound with the metal capable of emitting the characteristic spectrum of the metal alone during electric discharge and subsequently reducing the pressure by removing the excess gases.

8. The method according to claim 7 wherein the gas introduced is nitrogen to form the nitride of the metal.

9. The method of forming a molecular compound of an alkali metal with a gas in a glow discharge tube which comprises admitting the gas to the exhausted tube at the moment when the alkali metal is at red heat and subsequently pumping out the excess gases.

10. A self-renewing cold-electrode glow discharge tube employing as electrically excitable luminescent material a normally unstable molecular compound of an atom of a metallic element with an atom of a permanent gas, said compound being stable under the conditions of electrical discharge in the tube.

11. A glow discharge tube according to claim 10 and containing a salt of radium adapted to produce radium emanation to assist in starting electrical discharge within the tube.

12. A self-renewing cold-electrode glow discharge tube containing a salt of radium and employing as electrically excitable luminescent material a normally unstable molecular compound of an atom of a metallic element with an atom of nitrogen, said compound being stable under the conditions of electrical discharge in the tube.

13. A self-renewing cold-electrode glow discharge tube employing as electrically excitable luminescent material a normally unstable molecular compound of an atom of an alkali-metal with an atom of a permanent gas, said compound being stable under the conditions of electrical discharge in the tube.

14. A glow discharge tube according to claim 13 and containing a salt of radium adapted to produce radium emanation to assist in starting electrical discharge within the tube.

15. A self-renewing cold-electrode glow discharge tube containing a salt of radium and employing as electrically excitable luminescent material a normally unstable molecular compound of an atom of an alkali metal with an atom of nitrogen, said compound being stable under the conditions of electrical discharge in the tube.

In testimony whereof, I have signed my name to this specification.

JACQUES BRETTMON.